Patented Oct. 29, 1935

2,019,209

UNITED STATES PATENT OFFICE 2,019,209

REFRACTORY FOR GLASS TANKS AND THE LIKE

Raymond C. Benner and Henry N. Baumann, Jr., Niagara Falls, N. Y., assignors to The Carborundum Company, Niagara Falls, N. Y., a corporation of Pennsylvania No Drawing. Application April 17, 1934, Serial No. 721,064. In Canada September 12, 1932

6 Claims. (Cl. 49—79)

This invention relates to furnaces, including glass tanks, and particularly to cast refractory linings therefor.

This application is a continuation in part of our application, Serial No. 570,758, filed October 23, 1931.

In the operation of glass tanks and similar furnaces, for which our invention is particularly well adapted, the refractory linings impose a limitation thereupon by restricting the temperature and the rate of operation. This is a decided disadvantage as there is a constant trend, as refractories are improved, to operate furnaces at higher temperatures and higher capacities. In the case of glass tanks, circulation and mixing of the molten glass must be maintained in the melting compartment in order to reduce any tendency of the melt to striate. However, the flow of the molten glass has so deleteriously affected the refractories forming the walls of the present furnace as to corrode them that the ability to use this beneficial stirring principle is distinctly limited by the refractories available. Moreover, the constant movement of glass past a given part of the tank or feeder (or the movement of the part through the glass) considerably shortens the life of the part. Examples of refractory parts which are damaged by the flow of molten glass are refractory stirrers for mechanical agitation, needles, feeder nozzles, and other feeder parts at the outlet, as well as throat blocks used in glass tanks to divide the melting end from the working end. Such refractory parts are all surrounded on several sides by hot glass in more or less constant motion and corrosion readily takes place, soon rendering the parts unfit for use.

We have discovered that fused cast refractory pieces consisting essentially of alumina, silica and an alkali or an alkaline earth oxide are well adapted to withstand the above referred to corrosive action of molten material in a glass melting tank or similar furnace. The refractory lining for these furnaces, and the exposed parts above referred to have, when made of a material such as our invention contemplates, a longer life due to their greater resistance to the corrosive action of the furnace contents.

We have in particular found refractories high in crystalline alumina in which an alkali, such as sodium oxide or potassium oxide, or an alkaline earth oxide, such as calcium, barium or magnesium, is a constituent to be well adapted to withstand the corrosion incurred in glass tanks, especially in the parts of the furnace where corrosion is ordinarily most marked, such as at the upper surface of the glass, commonly designated as the metal line, in the throat, near the charging door, and for special parts having contact with the molten glass moving at relatively high velocities. Tests show, however, that refractories containing an alkali are superior to refractories containing alkaline earth oxides, and in our preferred composition we use sodium oxide or potassium oxide, or a mixture of the two.

Examples of compositions that are particularly well adapted for the making of refractory linings for furnaces of the type described herein are as follows, the first example being one we at present prefer:

I (Product)

| | Per cent |
|---|---|
| Alumina | 85–90 |
| Silica | 2–15 |
| $Na_2O$ or $K_2O$ or a mixture of $Na_2O$ and $K_2O$ | 1–10 |

II (Batch)

| | Per cent |
|---|---|
| Bauxite | 94 |
| Soda ash | 6 |

III (Batch)

| | Per cent |
|---|---|
| Alumina ore containing approximately 3% silica | 97 |
| Barium carbonate | 3 |

IV (Product)

| | Per cent |
|---|---|
| Alumina | 90 |
| Silica | 5 |
| Soda | 5 |

Hereafter when we speak of alkaline oxides, we intend the term to mean the oxides of the alkali metals sodium and potassium, and of the alkaline earth metals calcium, magnesium and barium, or their equivalents.

It is not apparent to us just why refractories containing 80% or more of crystalline alumina are so successful in withstanding the attack of the molten glass, inasmuch as the various ingredients of the glass, such as silica, soda and lime, are each capable of reacting with alumina at the temperatures prevailing in glass tanks. Notwithstanding this fact, however, refractories of this type have been found to be far superior to more siliceous refractories such as for example fire-clay, sillimanite and mullite, in resisting corrosion. Furthermore, cast refractories which are produced from alumina, adding, in accordance with our invention, a few per cent of sodium oxide or other alkaline oxide, are particularly effective in resisting corrosion at the metal line of the glass tank.

It is further phenomenal that this type of refractory is outstandingly resistant to attack by fluoride glasses. Inasmuch as in the manufacture of metallic aluminum, it is the customary practice to dissolve aluminum oxide in a molten fluoride bath (cryolite), it might be expected that the fluoride glass would attack our alumina refractories severely and rapidly. This, however, is not the case, but one the contrary, cast alumina blocks containing up to 5% sodium oxide are more resistant to attack by fluoride glass than any other refractory which has been found. By direct comparison, it has been found that blocks of material containing, as herein described, small percentages of alkaline oxides are definitely superior to otherwise similar blocks in which the alkali is omitted. Oxides of the alkali metals give somewhat better results than do those of the alkaline earths.

In the production of the refractories for the construction of our improved glass tank, we take alumina, usually in the form of bauxite or other high alumina ore, and fuse it in a furnace such as a submerged arc furnace (as for instance that disclosed in United States Patent No. 929,517 to F. J. Tone) similar to that used in the production of synthetic alumina abrasives. Soda, usually in the form of soda ash, is either admixed with the original ore or is admixed in much larger proportions with a special charge of ore that is added to the furnace after fusion of the main bulk has been completed and after any reducible impurities, such as iron oxide or silica, have been largely eliminated. The addition of the soda by the latter method enables the proportion of silica in the final melt to be controlled. In general, we find it desirable to keep the silica in the lower part of the range specified, since in that way, the proportion of alumina crystals is increased and the proportion of intercrystalline glass in the finished refractory, minimized.

In carrying out the fusion, the furnace generally consists of a water-cooled iron shell, having no other lining than that built up by the material being fused as it is fed into the furnace. Fusion is effected initially by the heat from a carbon train between two or more carbon or graphite electrodes inserted in the iron shell, but after a bath of molten material is formed the resistance of this material to the passage of electric current therethrough is used to supply heat. The material is gradually fed in, and the electrodes raised as the fused mass is built up. In case the furnace charge is high in undesired impurities such as iron oxide or contains too much silica, crushed coke may be added to the charge to reduce such material to metallic form or the bath may be reduced by reaction with the electrodes. The metal so reduced is heavier than the molten oxides and settles to the bottom of the furnace where it remains until the end of the run when it can be separately removed. It is sometimes found desirable to scavenge this finely divided metal and hasten its settling by adding metal such as iron borings directly to the furnace. The procedure followed here is substantially similar to that employed in making aluminous abrasives.

When the material has arrived at the proper temperature and the correct degree of fluidity, it is poured into molds of the desired shape and size.

The molded pieces are left in the mold for heat treatment or, particularly in the case of iron molds, are taken from the molds shortly after the outer walls of the casting have solidified. Thereafter, they are carefully cooled by any of the methods well known in the art, and after they are cold, any objectionable remainder of the header or other minor roughness is removed by chipping or grinding. Considerably less care than usual is required in the annealing of our improved refractories, and the time required to carry out the annealing process is distinctly shorter.

Refractories of the type described in the present application are so resistant to corrosion by the flow of molten glass that it is possible to operate a glass tank having a lining and other parts composed of such refractories at a temperature at least 100° C. hotter than the temperatures employed in furnaces using refractories of the usual type. The capability of operating the furnaces at such high temperatures increases the rate of production in the furnace due to the fact that high temperatures increase the rate of fusion of the constituents of the glass and set up a relatively rapid and intensive circulation that thoroughly mixes very large batches of the mix. This is a very important commercial feature inasmuch as an increase in the capacity of a furnace results in a decrease in time consumed in the production of the melt.

Moreover, these refractories are advantageous where, in the operation of furnaces at the usual temperatures, it is found desirable to thoroughly insulate the outside of the tank so that there will be a minimum loss of heat through the wall. As such insulation insures against any drop in temperature at the outer edge of the melt, it promotes better furnace operating conditions, but heretofore the destructive effect of the refractory bricks has militated against its adoption. Furthermore, the throats of the tanks may be operated with little or no air cooling in spite of the fact that the refractory used is in constant contact with hot glass on three sides. The insulation of the outside of the tank and elimination of cooling means permits considerable savings in direct loss of heat, as well as in space and accessory equipment.

We claim:

1. A cast refractory article consisting of 85 to 97% alumina, 1 to 10% of an alkaline oxide and 2 to 14% silica.

2. A cast refractory article consisting of 85 to 97% alumina, 1 to 10% of sodium oxide and 2 to 14% silica.

3. A refractory composition composed of at least 80% crystalline alumina and a matrix comprising an alkaline oxide.

4. A refractory composition composed of at least 80% crystalline alumina and a matrix comprising sodium oxide.

5. A cast refractory article composed of at least 80% crystalline alumina and a matrix comprising barium oxide.

6. A cast refractory article composed of alumina and approximately 5% each of silica and sodium oxide.

RAYMOND C. BENNER.
HENRY N. BAUMANN, Jr.